(12) United States Patent
Luo et al.

(10) Patent No.: US 12,489,873 B1
(45) Date of Patent: Dec. 2, 2025

(54) METHOD AND DEVICE FOR CONSTRUCTING LAMP CHAIN CIRCLING MODEL AS WELL AS APPARATUS AND PRODUCT

(71) Applicant: Shenzhen Qianyan Technology Ltd., Shenzhen (CN)

(72) Inventors: Quanshuang Luo, Shenzhen (CN); Wenlong Wu, Shenzhen (CN)

(73) Assignee: Shenzhen Qianyan Technology Ltd., Shenzhen (CN)

( * ) Notice: Subject to any disclaimer, the term of this patent is extended or adjusted under 35 U.S.C. 154(b) by 0 days.

(21) Appl. No.: 19/176,107

(22) Filed: Apr. 10, 2025

(30) Foreign Application Priority Data

Jul. 12, 2024 (CN) .......................... 202410937072.2

(51) Int. Cl.
*H04N 13/111* (2018.01)
*G06T 7/13* (2017.01)
*H04N 13/15* (2018.01)

(52) U.S. Cl.
CPC .............. *H04N 13/111* (2018.05); *G06T 7/13* (2017.01); *H04N 13/15* (2018.05)

(58) Field of Classification Search
CPC ........ H04N 13/111; H04N 13/15; G06T 7/13; G06T 15/10; G06T 15/50; G06T 15/506; H05B 47/125
USPC .................................................... 348/43, 135
See application file for complete search history.

(56) References Cited

U.S. PATENT DOCUMENTS

2023/0292422 A1* 9/2023 Franciosa ................. G06T 7/55

FOREIGN PATENT DOCUMENTS

| CN | 116383915 A | * | 7/2023 | ............. H05B 47/10 |
| CN | 118115571 A | * | 5/2024 | ............... G06T 3/60 |

OTHER PUBLICATIONS

Machine translation of CN 118115571 A (Year: 2024).*
Machine translation of CN 116383915 A (Year: 2023).*

* cited by examiner

*Primary Examiner* — Christopher S Kelley
*Assistant Examiner* — Ana Picon-Feliciano
(74) *Attorney, Agent, or Firm* — Wenye Tan

(57) ABSTRACT

A method for constructing a lamp chain circling model comprises: obtaining an on-site image of a lamp chain that spirally circles around an external carrier, determining a planar spatial position of each front lamp bead of the lamp chain in an image view space, and determining a conical model of the external carrier; unfolding the conical model into a sector-shaped reference region in the image view space; arranging each circle of rear lamp beads on the surface of the sector-shaped reference region according the missing number of each circle of rear lamp beads on the lamp chain, and determining sector-shaped spatial positions of all the lamp beads in the sector-shaped reference region; mapping the sector-shaped spatial positions of the lamp beads on the surface of the sector-shaped reference region to corresponding stereoscopic spatial positions in a modeling space, and obtaining the lamp chain circling model.

10 Claims, 5 Drawing Sheets

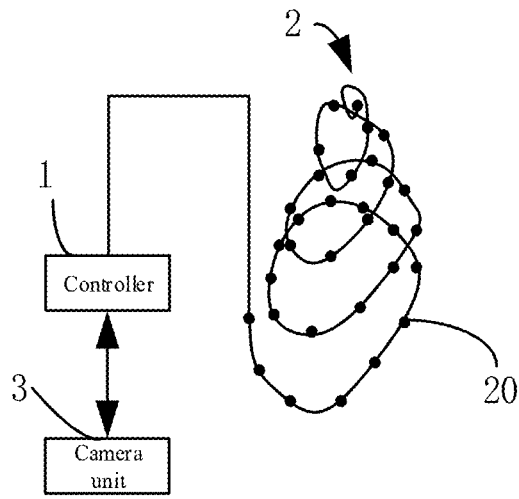

Figure 1

```
┌─────────────────────────────────────────────────────────────────────┐
│ obtaining an on-site image of a lamp chain that spirally circles around an external carrier, │  S5100
│ determining a planar spatial position of each front lamp beads of the lamp chain in an image │
│ view space under an image shooting perspective, and determining a conical model adapted to   │
│                        the external carrier in a spiral shape                                │
└─────────────────────────────────────────────────────────────────────┘
                                    │
                                    ▼
┌─────────────────────────────────────────────────────────────────────┐
│ unfolding the conical model into a sector-shaped reference region in the image view space, so │  S5200
│ that each front lamp bead is located on the surface of the sector-shaped reference region    │
│                    according to the planar spatial position of each front lamp bead          │
└─────────────────────────────────────────────────────────────────────┘
                                    │
                                    ▼
┌─────────────────────────────────────────────────────────────────────┐
│ arranging rear multiple circles of lamp beads on the surface of the sector-shaped reference │  S5300
│ region according the missing number of the multiple circles of rear lamp beads on the lamp  │
│ chain outside the image shooting perspective, and determining sector-shaped spatial positions │
│              of all the lamp beads in the sector-shaped reference region                     │
└─────────────────────────────────────────────────────────────────────┘
                                    │
                                    ▼
┌─────────────────────────────────────────────────────────────────────┐
│ mapping the sector-shaped spatial positions of the lamp beads on the surface of the sector- │  S5400
│ shaped reference region to corresponding stereoscopic spatial positions in a modeling space │
│        where the conical model is located, and obtaining the lamp chain circling model.     │
└─────────────────────────────────────────────────────────────────────┘
```

Figure 2

METHOD AND DEVICE FOR CONSTRUCTING LAMP CHAIN CIRCLING MODEL AS WELL AS APPARATUS AND PRODUCT

CROSS-REFERENCES TO RELATED APPLICATIONS

This application claims priority to Chinese Patent Application No. CN2024109370722, filed on Jul. 12, 2024, the content of which is hereby incorporated by reference in entirety.

FIELD

The present disclosure pertains to the field of lighting control, and particularly relates to a method and a device for constructing a lamp chain circling model, as well as an apparatus and a product.

BACKGROUND

In the traditional technical means, the construction of a lamp chain circling model tends to depend on complex image processing and deep learning models. When dealing with a lamp chain that has a large scale or a complex layout, these approaches are not only low in recognition efficiency but also insufficient in precision. When designing lighting effects, a user needs to rely on model data that correctly correspond to the arrangement form of the lamp chain. However, in the prior art, it is difficult to provide these data quickly and accurately, resulting in a tedious and time-consuming design process. In addition, the high demand for computing resources in the deep learning models keeps the implementation cost high, thereby limiting the popularity of the smart lighting technology.

SUMMARY

According to one aspect of the present disclosure, there is provided a method for constructing a lamp chain circling model, comprising:
  obtaining an on-site image of a lamp chain that spirally circles around an external carrier, determining a planar spatial position of each front lamp beads of the lamp chain in an image view space under an image shooting perspective, and determining a conical model adapted to the external carrier in a spiral shape;
  unfolding the conical model into a sector-shaped reference region in the image view space, so that each front lamp bead is located on the surface of the sector-shaped reference region according to the planar spatial position of each front lamp bead;
  arranging multiple circles of rear lamp beads on the surface of the sector-shaped reference region according the missing number of the multiple circles of rear lamp beads on the lamp chain outside the image shooting perspective, and determining sector-shaped spatial positions of all the lamp beads in the sector-shaped reference region;
  mapping the sector-shaped spatial positions of the lamp beads on the surface of the sector-shaped reference region to corresponding stereoscopic spatial positions in a modeling space where the conical model is located, and obtaining the lamp chain circling model.

According to another aspect of the present disclosure, there is provided a device for constructing a lamp chain circling model, comprising:
  an image analysis module, which is configured to obtain an on-site image of a lamp chain that spirally circles around an external carrier, determine planar spatial positions of front lamp beads of the lamp chain in an image view space under an image shooting perspective, and determine a conical model adapted to the external carrier in a spiral shape;
  a model unfolding module, which is configured to unfold the conical model into a sector-shaped reference region in the image view space, so that each front lamp bead is located on the surface of the sector-shaped reference region according to the planar spatial position of each front lamp bead;
  a rear inference module, which is configured to arrange multiple circles of rear lamp beads on the surface of the sector-shaped reference region according the missing number of the multiple circles of rear lamp beads on the lamp chain outside the image shooting perspective, and determine sector-shaped spatial positions of all the lamp beads in the sector-shaped reference region;
  a description construction module, which is configured to map the sector-shaped spatial positions of the lamp beads on the surface of the sector-shaped reference region to corresponding stereoscopic spatial positions in a modeling space where the conical model is located, and obtain the lamp chain circling model.

According to another aspect of the present disclosure, there is provided a computer apparatus, comprising a central processing unit and a memory, wherein the central processing unit is used for calling and running computer programs stored in the memory to execute steps in the method for constructing a lamp chain circling model.

According to another aspect of the present disclosure, there is provided a computer program product, comprising computer programs or computer instructions, wherein steps in the method for constructing a lamp chain circling model are executed when the computer programs or the computer instructions are called and run by a central processing unit.

BRIEF DESCRIPTION OF DRAWINGS

FIG. 1 is an electrical structure diagram of an exemplary ambient lamp apparatus in the present disclosure;

FIG. 2 is a flow diagram of a method for constructing a lamp chain circling model in the embodiments of the present disclosure;

DETAILED DESCRIPTION

Figure 3:
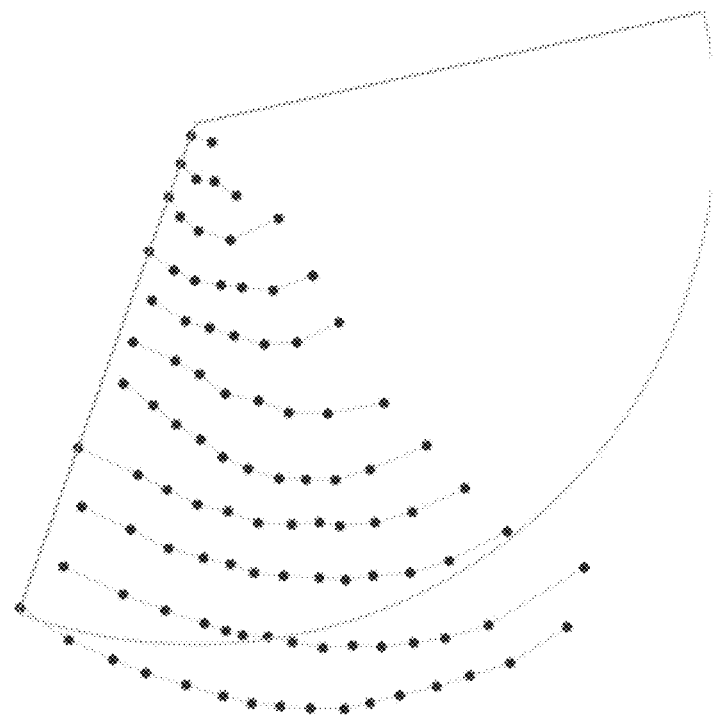
FIG. 3 shows a sector-shaped reference region for laying lamp beads and some front lamp beads located therein.

Referring to FIG. 1, as can be seen from the structure diagram of an ambient lamp apparatus provided in one embodiment of the present disclosure, the ambient lamp apparatus comprises a controller 1, a lamp chain 2, and an image acquisition interface, and the lamp chain 2 is in electrical connection with the controller 1, in order to work in coordination under control of computer programs that run in the controller 1, so as to play lighting effects.

In general, the controller 1 comprises a control chip, a communication assembly, and a bus connector. In some embodiments, the controller 1 can also be configured with a power adapter, a control panel, and a display screen among others according to needs.

The power adapter is mainly used for converting mains power into DC power, so as to supply power to the entire ambient lamp apparatus. The control chip can be implemented by using various types of embedded chips, such as Bluetooth SoC (System on Chip), WiFi SoC, MCU (Micro Controller Unit), and DSP (Digital Signal Processing). The control chip generally comprises a central processing unit and a memory, which are used for storing and executing program instructions to achieve corresponding functions, respectively. The various types of control chips as mentioned above can come with communication assemblies of their own, and they can also be configured with communication assemblies additionally according to needs.

The communication assembly can be used for communicating with external apparatuses. For example, it can communicate with personal computers or mobile terminals such as various types of smartphones, so that after the user issues various configuration instructions through his or her mobile terminal, the control chip of the controller 1 can receive the configuration instructions and accomplish the basic configuration through the communication assembly, so as to control the operation of the lamp chain. In addition, the controller 1 can also obtain interface images of terminal apparatuses through the communication assembly, or obtain real-time preview images collected by a camera unit 3.

The bus connector is mainly used for connecting the lamp chain 2 connected to a bus to a power source and providing lighting effect play instructions, and therefore provide pins that correspond to a power bus and a signal bus. As such, when the lamp chain 2 needs to be connected to the controller 1, it can be done by connecting a corresponding connector of the lamp chain 2 to a connector of the bus. The control panel generally has one or more buttons for performing switch control on the controller 1, selecting various preset lighting effect control manners, etc.

The display screen can be used for displaying various control information, so as to cooperate with the buttons in the control panel and support the implementation of human-computer interaction functions. In some embodiments, the control panel and the display screen can be integrated into the same touch screen.

The lamp chain 2 in the ambient lamp apparatus can be in the form of a lamp strip or a lamp string. With flexibility, it can take any shape in the arrangement layout. Each lamp chain 2 comprises multiple lamp beads 20 connected in series, each lamp bead 20 serves as a light-emitting unit, and the lamp beads 20 in each lamp chain 2 can be the same in number and arranged at equal intervals. The working current of the lamp beads 20 in the same lamp chain 2 is transmitted via the same set of cables connected to the bus. In terms of the electrical connection relationship, the lamp beads 20 in the same lamp chain 2 can be connected in parallel.

The image acquisition interface can be either a hardware interface or a software interface that is implemented in the controller 1. When it is a hardware interface, the image acquisition interface can be implemented as the camera unit 3, and the controller 1 loads a corresponding driver program to drive the camera unit 3 to work. In one application, the camera unit 3 can be used for shooting images of the lamp chain to obtain on-site images that are required to determine the lamp chain circling model. The camera unit 3 can be used for shooting interface images that are required to generate lighting effect control data.

When the camera unit 3 is aimed at a target image, such as a display desktop of a terminal apparatus and a physical space environment, an interface image can be collected by collecting images at a certain frame rate. When it is a software interface, the image acquisition interface can be implemented as an image acquisition program on the controller 1 side, with the help of the graphics infrastructure technique provided by the operating system of the terminal apparatus. As the controller 1 is connected to the terminal apparatus via various types of cables, such as HDMI and Type-C cable, it can continuously obtain the interface image of the terminal apparatus with the support of the graphics infrastructure technique. Of course, if the controller 1 establishes a wireless screen mirroring protocol with the terminal apparatus in advance, it can also obtain the interface image of the terminal apparatus through wireless communication. The graphics infrastructure technique of operating systems varies depending on the type of the operating systems. For example, in the Windows operating system, this function can be achieved by providing the corresponding technique, i.e., Microsoft DirectX Graphics Infrastructure, abbreviated as DXGI.

As can be seen, when the image acquisition interface is responsible for collecting environmental reference images, the specific environment in which the images are collected can be flexibly set by the user. For example, when the image acquisition interface is the camera unit 3, the user can aim the camera unit 3 at a graphical user interface of a computer and shoot images, so as to collect a corresponding interface image as the target image for playing lighting effects, so that the lamp chain 2 can generate corresponding lighting effect description data according to the interface image; the user can also aim the camera unit 3 at a physical space environment, such as an outdoor environment, and shoot real-scene images as environmental reference images, so that the lamp chain 2 can generate lighting effect description data that correspond to real scenes.

When the ambient lamp apparatus needs to play lighting effects according to the lighting effect description data, the controller 1 thereof needs to provide the serial position and spatial position of each light-emitting unit in the lamp chain 2 thereof by virtue of the lamp chain circling model, parses the corresponding lighting effect description data into control data of each light-emitting unit according to the spatial position of each light-emitting unit, encapsulates the control data of each light-emitting unit into the lighting effect control data in the order of the serial position, and then sends the lighting effect control data to the corresponding lamp chain; the control chip of each light-emitting unit in the lamp chain extracts the control data that correspond thereto, and controls each light-emitting element to emit corresponding colored light according to the control data; under the synergistic effect of the colored light emitted by each light-emitting unit, the entire lighting effect is played.

It is not difficult to understand that the computer apparatus of the present disclosure comes with a camera unit and a graphical user interface, wherein the camera unit 3 can be used for shooting an on-site image and generating a lamp chain circling model based thereon. The lamp chain circling model describes the serial position of each lamp bead in the lamp chain, as well as the mapping relationship with the spatial position of the lamp chain in a modeling space that corresponds to the physical space. Based on this, the computer apparatus can also generate a corresponding lamp chain circling model, which is graphical, and display it in the graphical user interface according to the spatial position of each lamp bead in the lamp chain circling model, thereby allowing the user to edit the control data of each lamp bead in the lamp chain circling model to construct corresponding light effects. Then, according to the information provided by the lamp chain circling model, the computer apparatus can follow the correspondence between the spatial positions and the serial positions of the lamp beads in the lamp chain circling model, and convert them to the lighting effect control data that can be parsed by the control chip of each lamp bead in the lamp chain, for controlling the lamp chain to play corresponding light effects.

Referring to FIG. 2, in some embodiments, the method for constructing a lamp chain circling model in the present disclosure is illustrated by giving an example where a computer apparatus, to which the method is applied, serves as a mobile terminal, for the convenience of vivid understanding. The method comprises:

Step S5100: obtaining an on-site image of a lamp chain that spirally circles around an external carrier, determining a planar spatial position of each front lamp beads of the lamp chain in an image view space under an image shooting perspective, and determining a conical model adapted to the external carrier in a spiral shape;

In one of typical application scenarios, lamp chains are used in a Christmas tree to create a warm and cheerful festive atmosphere. In hope that these lamp chains add more festive atmosphere through color changes and dynamic effects, the user needs to exercise precise control over the lamp chains. It is necessary to construct one lamp chain circling model that matches the actual spiral forms of the lamp chains. The lamp chain circling model can be displayed in various display apparatuses, so that the user intuitively recognizes each lamp bead in the interface and precisely sets the light-emitting information for each lamp bead, thereby achieving the personalized customization of the lighting effects of the lamp chains.

Since the lamp chains are flexible, the user generally winds them spirally around the surface of the Christmas tree to circle from the bottom of the tree to the top thereof. Each lamp bead is like a decorative star in the tree, and is uniformly dotted between the trunk and branches. However, due to the three-dimensional form and irregular surface of the Christmas tree, the layout of the lamp chains visually presents a complex spiral arrangement. The user hopes to control these lamp beads through a smart lighting system, so as to achieve dynamic lighting effects, such as gradient effect, flicker effect, and chasing effect. It is a key foundation to precisely represent positions of the lamp beads of the lamp chains in a physical space.

Taking the decoration of the Christmas tree as an example, the Christmas tree is seen as an external carrier, around which the lamp chain circles and winds. However, the external carrier can be various types of physical objects, such as decorative lamp posts and chimneys among other products that facilitate the spiral circling and winding of the lamp chain.

The user first needs to use the camera unit of the mobile terminal to shoot an image of the Christmas tree decorated with the lamp chain. During the shooting, one or more image shooting perspectives are determined to ensure that the entire Christmas tree can be clearly recorded by the camera unit, including all regions from the bottom portion of the tree, the middle portion, to the top portion.

In the process of the image capture, in one embodiment, if the color displayed by each lamp bead in the lamp chain possesses uniqueness and can be accurately recognized, a single on-site image that corresponds to a single perspective can be used for processing. In another embodiment, the user is also allowed to adjust the perspective appropriately and shoot images from different image shooting perspectives, so as to determine all the front lamp beads that correspond to one of the image shooting perspectives as accurately as possible by collecting multiple on-site images. In the embodiment, given the existence of multiple image shooting perspectives, the image shooting perspective that corresponds to the clearest on-site image can be determined as a benchmark. Subsequently, other on-site images are aligned with the benchmark, and the front lamp beads of all the on-site images are subjected to image alignment, so as to realize recognition of all the front lamp beads as many as possible. Regarding the spirally arranged lamp chain, for the convenience of indexing, priority can be given to ensuring that starting and ending points of the lamp chain, as well as the path of the lamp beads circling along the trunk, can be clearly identified in the image.

Corresponding to the on-site image, an image view space can be created. The image view space is a two-dimensional virtual space for mapping and representing the positions of the lamp beads of the lamp chain in the image. In general, the space uses four corners of the image as reference points to establish a two-dimensional coordinate system, wherein the position of each lamp bead is represented by a coordinate pair (x, y), the coordinate x represents the horizontal positions of the lamp beads in the image, and the coordinate y represents the vertical positions of the lamp beads in the image.

Based on the image view space, the planar spatial positions of the lamp beads can be easily determined. As such, in some embodiments, the on-site image can first be subjected to image preprocessing, which includes any one or more technical means of adjustment of the brightness and contrast of the on-site image, removal of noise, etc. The purpose is to improve the overall quality of the image and ensure that the lamp beads in the on-site image can be clearly recognized. Subsequently, image recognition technique is applied to recognize the lamp beads in the image, which can be done by using any algorithm such as edge detection, threshold segmentation, and pattern recognition. These techniques can help distinguish the lamp beads from the background and display them clearly in the image.

Once the lamp beads are recognized, they can be mapped onto the two-dimensional coordinate system of the image view space, so as to determine the coordinates (x, y) of the center point of each lamp bead. To ensure the accuracy of the coordinates, position deviation that may be caused by the shooting perspective or apparatus distortion can also be calibrated according to needs. Upon the completion of calibration, the coordinates of each lamp bead are recorded in detail as a planar spatial position, and these data are the key foundation for constructing the lamp chain circling model.

In some embodiments, the lamp chain is designed in advance with an instruction list, in which the serial position of each lamp bead and the time-domain color display sequence thereof featured with uniqueness are stored. The time-domain color display sequence comprises display colors at multiple time sequences. When the user initiates the construction of the lamp chain circling model at a terminal, the terminal constructs multiple color display play instructions that correspond to time sequences of the time-domain color display sequence according to the instruction list in advance, and sends these color display play instructions to the lamp chain in an orderly manner. The lamp chain lights up and displays the corresponding colors of the lamp beads at multiple time sequences according to these color display play instructions. As such, by collecting multiple on-site images in correspondence with the time sequences, the time-domain color display sequences of the front lamp beads can be obtained from said multiple on-site images. Further, by querying the instruction list, the serial position of each lamp bead can be determined, i.e., the identity of each lamp bead is determined. A mapping relationship can be established between the serial positions of the front lamp beads obtained based thereon and the planar spatial positions thereof, so as to provide assistance as needed in the construction process of the lamp chain circling model. Obviously, these embodiments can further improve the efficiency in recognizing the lamp beads and the efficiency in constructing the lamp chain circling model.

To determine the stereoscopic space where the lamp chain circles and winds, image analysis can be further performed on the basis of the on-site images to recognize the region where the lamp chain winds, and based on this, a geometric model that can simulate the lamp chain circling model can be constructed.

First of all, provided by the on-site images, the visual information on the distribution and form of the lamp chain on the external carrier is used for image analysis, and the contour of the external carrier is recognized. As the edge detection techniques or image segmentation models are used for implementation, the external carriers can be separated from the background thereof, so as to determine the boundary thereof. It is not difficult to understand that the overall contour of the lamp chain may also be recognized, so as to recognize the circling contour of the lamp chain. The contour of the lamp chain is basically similar to that of the external carrier, and they can be directly equivalent.

Subsequently, according to the recognized contour information, a preliminary geometric model is constructed, and the model can represent the circling form of the lamp chain on the external carrier. Multiple geometric forms can be used to approximately represent the form of the lamp chain, wherein the conical model is preferred in the present disclosure due to the mathematical and physical simplicity thereof.

To ensure that the conical model can be accurately adapted to the actual form of the external carrier, adjustment and optimization can be made to the model, including adjustment of size, shape, and orientation, so as to match the display of the lamp chain in the on-site image. In some cases, it can also be adapted to the irregularity of the external carrier, such as forked branches or uneven surfaces, and corresponding deformation or adjustment can be made to the conical model.

Finally, the obtained conical model can accurately reflect the distribution of the lamp chain in the three-dimensional space, which provides a reliable basis for the next step of mapping the positions of the lamp beads and constructing the lamp chain circling model. In this way, regardless of the shape of the external carrier, around which the lamp chain winds, an appropriate three-dimensional model can be constructed to achieve precise representation of the lamp chain circling model.

In some embodiments, if the contour information of the external carrier indicates that it can be broken down into multiple geometric models, e.g., the external carrier exhibits a structure of multiple stacked pyramids under the image shooting perspective, then it can also be processed in partitions; corresponding to each pyramid, one conical model is established, and then subsequent processing of the present disclosure is performed on the basis of each conical model.

Step S5200: unfolding the conical model into a sector-shaped reference region in the image view space, so that each front lamp bead is located on the surface of the sector-shaped reference region according to the planar spatial position of each front lamp bead;

The conical model is only a temporary geometric structure representative of the lamp chain circling model, and has not yet been associated with the specific positions of the lamp beads. In order that the planar spatial positions of the lamp beads as represented in the image view space correspond to the conical model, it is necessary to first unfold the conical model into a sector. To be specific, the side surface of the cone can be unfolded along a generatrix thereof, so as to form a sector-shaped reference region that takes the vertex of the cone as a circle center and the length of the side surface of the cone as a radius.

After the conical model is unfolded into a sector-shaped reference region, each point of the conical model is mapped to a corresponding point on the sector. The mapping process is based on the principle of geometric projection, which ensures that the planar spatial positions of the lamp beads on the sector-shaped reference region can be accurately converted to the modeling space where the conical model is located, so as to obtain the corresponding stereoscopic spatial positions.

During the specific implementation, different unfolding methods can be selected according to the actual circling form of the lamp chain and the specific form of the external carrier. For example, if the lamp chain winds around a Christmas tree, the inclination angle of the trunk and the winding direction of the lamp chain will be taken into consideration when the conical model is unfolded. If the external carrier is a spiral staircase, the unfolded conical model will reflect the spiral form of the staircase.

In one embodiment, the generatrix of the conical model, i.e., one side edge of the sector-shaped reference region, can correspond to one side edge of the external carrier in the image view space. The unfolding into the sector-shaped reference region in the image view space is based on the side edge. As such, all the front lamp beads that have been recognized can be located just on the surface of the sector-shaped reference region, as shown in FIG. 3. Wherein, after the sector-shaped reference region is placed in the image view space, each lamp bead is located on one side of the sector-shaped reference region. The size of the sector-shaped reference space can also be zoomed in or out appropriately, so as to achieve a better display effect.

In some embodiments, in the unfolding process, the conical model can be adjusted appropriately according to actual needs, so as to ensure that the sector-shaped reference region can accurately reflect the actual layout of the lamp chain. The optional adjustment manners include, but are not limited to, adjusting any one of size, shape, and orientation of the conical model, so as to match the actual circling path of the lamp chain on the external carrier.

Step S5300: arranging rear multiple circles of lamp beads on the surface of the sector-shaped reference region according the missing number of the multiple circles of rear lamp beads on the lamp chain outside the image shooting perspective, and determining sector-shaped spatial positions of all the lamp beads in the sector-shaped reference region;

During the construction of the circling model of the lamp chain, determining the positions of the rear lamp beads in the sector-shaped reference region is an important step to realize the integrity of the model. The process is based on the characteristics of the circling path of the lamp chain in the physical space, i.e., viewing from the image shooting perspective, multiple circles (rows) of line segments appear in the front of the lamp chain, and between every two rows of front lamp beads, there are rear lamp beads in connection therewith on the rear side of the perspective.

During the specific implementation, the front lamp beads in the determined positions are first recognized in the image view space. These lamp beads are arranged in serial positions, and form multiple rows. Moreover, the serial positions thereof have been correlated in advance. The serial positions are usually represented by serial number for the convenience of calculation. For every two rows of front lamp beads, the serial positions of the lamp beads at the end thereof in respective connection with a row of lamp beads on the rear side are known. The information can be used to infer the number of missing rear lamp beads between the two rows of front lamp beads. For example, if the serial position of the first row of front lamp beads is known as Pm and the serial position of the second row of front lamp beads is known as Pn, the missing number between the two rows of front lamp beads, i.e., the total number of a row of rear lamp beads sandwiched between the two rows of front lamp beads, can be obtained by calculating the difference value between Pm and Pn.

Figure 4:
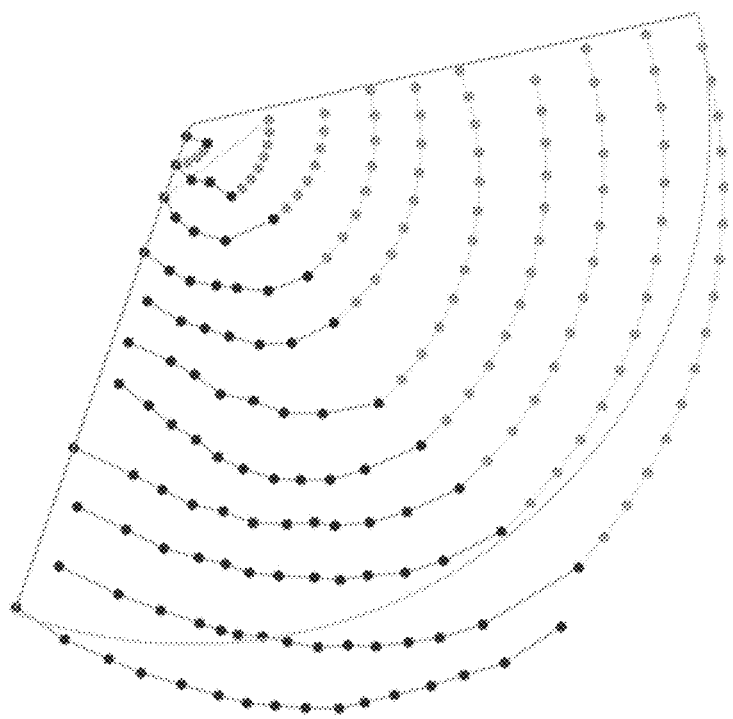
FIG. 4 is a diagram of rear lamp beads supplemented in the sector-shaped reference region in FIG. 3.

Subsequently, on the surface of the sector-shaped reference region, the missing rear lamp beads are arranged according to the missing number of each row of rear lamp beads as calculated. The arrangement can be made by extending the boundary line of two rows of front lamp beads, and the missing rear lamp beads, equally spaced, are placed on the extension line. For example, if N lamp beads are missing between two rows of lamp beads, then on the extension line of the boundary of the two rows of lamp beads, N rear lamp beads are arranged according to the uniform distribution pattern of the lamp beads. The effect in completing the arrangement of missing lamp beads is shown in FIG. 4. As can be seen from the figure, the rear lamp beads on the right side have been arranged in the sector-shaped reference space. As such, the corresponding sector-shaped spatial positions thereof are determined.

In addition, a polar coordinate system can be used to assist in determining the positions of the missing lamp beads. In the polar coordinate system, one side edge of the sector-shaped reference region is taken as a polar axis, the straight-line distance from a lamp bead to the circle center of the sector-shaped reference region is taken as a polar radius, and the angle between the lamp bead and the polar axis is taken as a polar angle. In this way, one sector-shaped space is created in the image view space. The sector-shaped space forms an independent reference frame on the basis of the polar coordinate system. Based on the reference frame, the position of each lamp bead, including the missing rear lamp beads, can be more precisely determined in the sector-shaped reference region, so as to obtain the representation of the sector-shaped spatial position of each lamp bead in the sector-shaped reference region.

In some embodiments, if the external carrier, around which the lamp chain winds, has multiple branches or irregular shapes, a sector-shaped reference region can be established individually for each branch or region, and the arrangement of the rear lamp beads can be carried out individually. In this way, no matter how complex the winding form of the lamp chain is, the positions of all the lamp beads can be accurately determined in this method.

Step S5400: mapping the sector-shaped spatial positions of the lamp beads on the surface of the sector-shaped reference region to corresponding stereoscopic spatial positions in a modeling space where the conical model is located, and obtaining the lamp chain circling model.

After the sector-shaped spatial position of each lamp bead in the lamp chain is obtained, accurate conversion from the two-dimensional plane to the three-dimensional space can be completed on the basis of these data, the mapping of the lamp beads is implemented from the image view space to the modeling space where the conical model is located, and the corresponding stereoscopic spatial position is obtained.

First of all, a mapping relationship between the sector-shaped reference region and the conical model is determined. The mapping is based on the positions of the lamp beads on the sector and the geometric characteristics of the conical model. Specifically speaking, the position of each lamp bead on the sector is represented by the polar coordinates thereof, i.e., the polar radius and the polar angle. The polar radius is the straight-line distance from the circle center of the sector to a lamp bead, while the polar angle is the angle between the connection line from the reference line of the sector, i.e., a side edge of the sector, which edge serves as the polar axis, to the lamp bead and the polar angle.

Subsequently, by using these polar coordinates, the position of each lamp bead is mapped onto a conical model through mathematical transformation. The conversion process involves converting two-dimensional polar coordinates to three-dimensional spatial coordinates. During the specific implementation, the polar coordinates of a lamp bead in the sector-shaped reference region is first converted to the corresponding Cartesian coordinates (x', y', z'). The conversion can be realized through standard mathematical formulas, wherein x' and y' correspond to the plane coordinates (x, y) in the image view space after unfolding into the sector, and z' can be determined on the basis of the height of the lamp bead on the conical model. Then, the three-dimensional coordinates obtained through the conversion can be further adjusted according to needs, so as to ensure that they accurately represent the position of the lamp bead on the conical model. The available adjustment manners include, but are not limited to, translation, rotation, and other geometric transformations of the coordinates, to match the direction and position of the conical model.

In the conversion process, the mapping relationship can also be optimized according to needs, for adaptation to external carriers in different shapes and sizes. For example, if the lamp chain winds around an object in an irregular shape, the mapping relationship can be adjusted to ensure that the position of the lamp beads accurately reflects the distribution thereof in the three-dimensional space.

Upon the completion of mapping, it can be verified whether the positions of the lamp beads in the three-dimensional space are consistent with the actual spiral form of the lamp chain by virtue of the confirmation operation of the user according to actual needs. In this way, it is ensured that the position of each lamp bead conforms to the expected layout.

The lamp chain circling model is generally stored in a structured computer-readable format, such as XML, JSON, and a custom binary format. These formats can clearly indicate both serial position identifiers that correspond to the serial positions of the lamp beads and the spatial position coordinates that correspond to the stereoscopic spatial positions.

In terms of data storage, the lamp chain circling model can be stored in either a built-in memory of a computer apparatus or an external storage apparatus. To improve access speed and efficiency, the model data are usually cached in RAM for immediate access and processing.

Figure 5:
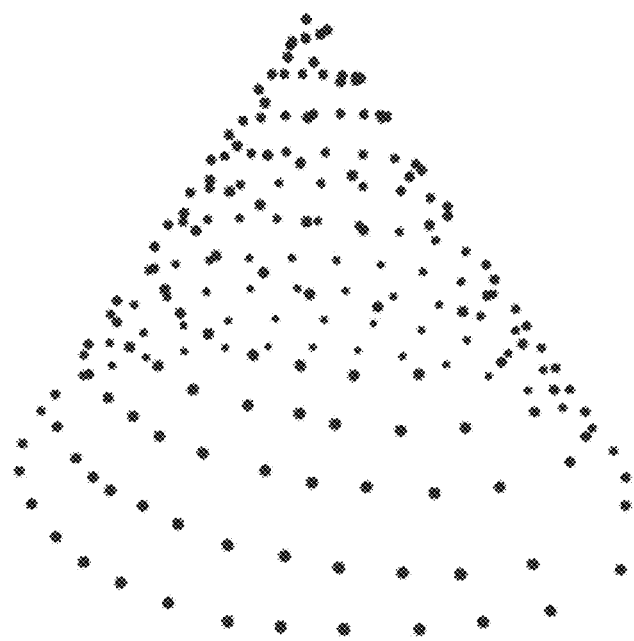
FIG. 5 is a diagram of a model image rendered according to the lamp chain circling model.

When the lamp chain circling model is displayed in the computer apparatus, the model data of the lamp chain circling model are converted to a visualized image through a graphics rendering engine, and the visualized image is unfolded in a graphical user interface. As shown in FIG. 5, the model image shows the circling form of the lamp chain in the three-dimensional space, and the user can observe the model from different angles by rotating, zooming, and moving the view.

To leverage the role of customized lighting effects, the computer apparatus can further provide editing tools, which allow the user to directly select lamp beads in the model image and set the light-emitting properties thereof, such as color, brightness, and flicker frequency. Upon the completion of editing, the lighting effect description data composed of these settings can be saved and sent to an actual lamp chain controller, and used for being parsed into lighting effect play instructions of the lamp chain, and controlling the lamp chain to emit light and achieve customized lighting effects.

As can be seen, compared with the traditional technology, the present disclosure brings to the field of smart lighting through the innovative spatial mapping technique groundbreaking beneficial effects, which include, but are not limited to:

first of all, the present disclosure greatly simplifies the modeling process by directly recognizing the external carrier, around which the lamp chain circles, in the on-site image and constructing a corresponding conical model for reference; the intuitive recognition and modeling manner not only improves the speed of model construction, but also enhances the adaptability to complex arrangement forms.

secondly, the present disclosure adopts a distinct unfolding technique to convert the conical model to a sector-shaped reference region, thereby providing a clear mapping plane for each lamp bead of the lamp chain; in this sector-shaped reference region, the spatial positions of the front and rear lamp beads are determined precisely; whether the front lamp beads under the image shooting perspective or the rear lamp beads outside the shooting perspective, the corresponding positions thereof can be found in the sector-shaped space.

furthermore, the mapping process of the present disclosure is not confined to a two-dimensional plane, but is to further map the sector-shaped spatial positions into a three-dimensional modeling space where the conical model is located; by converting the two-dimensional sector-shaped layout to the three-dimensional spatial layout, not only is the stereoscopic form of the lamp chain preserved, but also a precise stereoscopic spatial position is provided to each lamp bead; the mapping from the two-dimensional layout to the three-dimensional layout makes the lamp chain circling model more accurate and more vivid, and provides powerful data support for subsequent lighting design and effect demonstration;

in addition, through the innovative modeling method of the present disclosure, many limitations of the traditional technology, such as low recognition efficiency, insufficient precision, and high requirements on performances of apparatuses; the user can carry out the lighting design of the lamp chain more intuitively and more conveniently, without complex operations or professional programming skills; the implementation of the present disclosure not only improves the design efficiency and lowers the technical threshold, but provides the possibility of realizing personalized and dynamic lighting effects through precise model construction, which facilitates the user customizing the lighting effects, and greatly enriches the application scenarios and creative space of smart lighting systems.

On the basis of any embodiment of the method in the present disclosure, said determining a planar spatial position of each front lamp beads of the lamp chain in an image view space under an image capture perspective comprises:

Step S5131: constructing the image view space that corresponds to the on-site image;

To determine the planar spatial positions of the front lamp beads, an image view space that corresponds to the on-site image needs to be constructed. The image view space is a virtual two-dimensional space for mapping the planar spatial position of each lamp bead in the lamp chain. Taking four corners of the image as reference points, the space establishes a two-dimensional coordinate system, so that the position of each lamp bead can be represented by a coordinate pair (x, y).

Step S5132: using one or more on-site images, recognizing both unique color features provided by the lamp beads and the planar spatial positions thereof in the image view space;

The implementation of recognizing both the unique color features of the lamp beads and the planar spatial positions thereof by using on-site images can be adapted to different implementation situations.

In one embodiment, only a single on-site image needs to be shot, and light-emitting lamp beads in the image are recognized through the image processing technique. These lamp beads are distinguished in the image due to the unique color features thereof. For example, each lamp bead can be pre-programmed to display given color values, and these color values, as the unique features thereof, can be detected and recognized through the image analysis technique.

In the process of recognizing a single on-site image, the terminal will analyze the light-emitting information of each lamp bead, use color recognition algorithms to determine colors of the lamp beads, and identify light-emitting points with the colors in conformity with preset definitions as front lamp beads, thereby determining the planar spatial positions of these front lamp beads in the image view space, which positions are represented as corresponding coordinates (x, y). In a color recognition algorithm, the on-site image can be searched for a color cluster region with a given color value within a range of preset definitions. When there exists such a region and the area thereof exceeds a preset threshold value, it can be confirmed that there exist front lamp beads.

The range of preset definitions usually corresponds to the serial positions of the front lamp beads to determine the identities thereof.

In another embodiment, the recognition is based on multiple on-site images. In this case, dynamic features of the lamp chain are taken into consideration, i.e., the colors of the lamp beads can change over time, which forms a distinctive color change sequence. The terminal will capture on-site images of the lamp chain from images at multiple time sequences to obtain the light-emitting state of the lamp chain, and then analyze the color change of each lamp bead in each on-site image to obtain the time-domain color display sequence of each lamp bead.

By comparing images at different time points, the terminal can track color changes of the lamp beads and recognize color change modes thereof in the entire time sequence. These modes, as unique color features of the lamp beads, are associated with the serial positions thereof in advance, so as to realize the identity recognition of the lamp beads.

In the process of the recognition based on multiple on-site images, the terminal can also use the image alignment technique to ensure that the positions of the lamp beads can correspond accurately in different images. In addition, the image fusion technique can be used to integrate the data from multiple on-site images to improve the accuracy and robustness of the recognition.

As can be seen, whether it is a single image or multiple images, the terminal can accurately recognize the color features and the planar spatial positions of the lamp beads, so as to associate the information with the serial positions of the lamp beads later, which lays a solid foundation for constructing the lamp chain circling model.

Step S5133: querying a preset color display instruction list, determining serial positions of the lamp beads that correspond to the unique color features in the lamp chain, and mapping the planar spatial positions to the serial positions;

The color display instruction table is a data structure that is defined and stored in advance. It maps the unique color features of the lamp beads to the serial positions thereof, for the convenience of determining the identities of the lamp beads.

In the embodiments based on a single on-site image, the color display instruction list contains a color value that the lamp beads are supposed to display at given time points, and the color value can be generalized into a given color value range of for representation. After the terminal recognizes the color of the lamp beads in the image through the image processing technique, it will use the color display instruction list to search for the serial positions that correspond to the color value range. For example, if the color feature of one lamp bead matches one item in the color display instruction list, the terminal can determine the serial position of this lamp bead, and further associate the coordinates (x, y) of the planar spatial position thereof in the image view space with the serial position thereof.

In the embodiments based on multiple on-site images, the color display instruction list functions more complexly. It contains not only the color information of the lamp beads, but also the sequence information of the color changes of the lamp beads over time. The terminal analyzes the time-domain color display sequence of each lamp bead and compares it with the preset sequence in the color display instruction list, so as to determine the serial position of each lamp bead. Naturally, the planar spatial position of the lamp bead begins to map to the serial position.

As can be seen, in the two types of embodiments, once the color features of the lamp beads match items in the color display instruction list successfully, the terminal can map the planar spatial positions of the lamp beads to the serial positions, thereby associating each front lamp bead with one definite serial position identifier.

The color display instruction list is also used for controlling the lamp chain in advance. Specifically speaking, to recognize the unique color feature of each lamp bead, corresponding color display play instructions can be constructed according to the unique color feature that corresponds to each serial position in the color display instruction list and sent to the lamp chain to control the lamp beads to emit light according to preset color values or the time-domain color display sequence. These color display play instructions are represented as the serial positions of the lamp beads represent the unique color features thereof correspondingly, which ensures that each lamp bead can display color according to the predetermined color features in the color display instruction list. In this way, the terminal can obtain the color features of the lamp beads from the on-site images and use the color display instruction list to determine the serial position of each lamp bead.

Step S5134: determining part of lamp beads that lack the unique color features in the image view space, and determining the serial positions and the planar spatial positions of part of lamp beads according to relative positional relationship between those lamp beads and the lamp beads that have been subjected to establishment of the mapping, so as to obtain the serial positions and the planar spatial positions of all the front lamp beads.

In some cases, the user may encounter situations where some front lamp beads are not directly visible in the image since they are blocked by the external carrier. As a result, some lamp beads that should appear in the image view space lack the unique color features. To avoid the problem, it is necessary to take particular measures to determine the serial positions and the planar spatial positions of these missing lamp beads.

In one embodiment, regarding the missing front lamp beads, they can be inferred by analyzing the arrangement mode of recognized lamp beads in the image view space. If the lamp chain winds around a regular external carrier, such as a Christmas tree, the circling path thereof usually has certain regularity. Therefore, based on the distribution of the recognized lamp beads and the winding pattern of the lamp chain, the approximate positions of the missing lamp beads can be inferred. For example, if the lamp chain winds in a uniform spiral shape and the interval between adjacent lamp beads is known, a distance between two visible front lamp beads can be measured, and the expected positions of the blocked front lamp beads can be calculated according to the interval.

In another embodiment, the physical characteristics of the lamp chain, such as equidistant arrangement, can be utilized to determine the positions of the missing lamp beads. By measuring the distance between the recognized lamp beads and applying the pattern, the approximate positions of the missing lamp beads on the lamp chain can be calculated. For example, if the lamp chain is designed with one lamp bead every 10 centimeters while the distance between two recognized front lamp beads in the on-site image is 30 centimeters, it can be inferred that there should be two missing lamp beads between the two lamp beads. As such, the planar position information of the two missing lamp beads can be determined on the line connecting the two recognized front lamp beads. At the same time, according to the numerical values of the serial positions of the two recognized front lamp beads, the serial positions of the two missing lamp beads can also be determined.

In another embodiment, if the winding path of the lamp chain is complex or irregular, the positions of the missing lamp beads can be estimated by using interpolation algorithms in the image processing technique. According to the spatial distribution of the recognized lamp beads, the interpolation algorithms can be used to predict the planar spatial positions of the missing lamp beads by calculating the spatial relationship thereof.

In another embodiment, the on-site images from multiple perspectives can be used in combination to reduce the impact of blockage. By shooting the lamp chain from different angles and using the image fusion technique such as panoramic stitching algorithms to integrate multiple images together, the lamp beads can be recognized in a more comprehensive manner, including those lamp beads that may be blocked under a single perspective.

In the above embodiment, the process of determining the serial positions and the planar spatial positions of the missing front lamp beads is essentially based on the relative positional relationship between these lamp beads and the recognized lamp beads. The relative positional relationship is used to determine the arrangement pattern thereof and the distance therebetween in the image view space by analyzing the distribution of the recognized lamp beads, so as to infer the expected positions of the missing lamp beads.

In the first embodiment, if it is known that the lamp chain winds in a uniform spiral shape and the interval between the recognized lamp beads is consistent, the expected positions of the missing lamp beads can be determined through simple linear interpolation. In the method, it is assumed that the arrangement of the lamp chain is continuous and uniform. Therefore, if the distance between two recognized lamp beads is twice that between other adjacent lamp beads, it can be inferred that there should be one missing lamp bead between these two lamp beads.

In the second embodiment, by utilizing the physical characteristics of the lamp chain, such as equidistant arrangement, the accurate positions of the missing lamp beads can be determined through mathematical calculation according to the positions of the recognized lamp beads and the preset interval between the lamp beads. The method relies on the standardization in the design of the lamp chain, i.e., the fixed distance between the lamp beads, thereby allowing the missing data to be filled through calculation.

In the third embodiment, when an interpolation algorithm is used, the algorithm will consider the spatial distribution of the recognized lamp beads, and estimate the positions of the missing lamp beads by analyzing the relative distance and angle between these lamp beads. The algorithm can handle more complex winding paths, and even provide accurate prediction when the distribution of the lamp beads is not completely regular.

Finally, in the fourth embodiment, those lamp beads that are not visible under a single perspective can be revealed by fusing images under multiple perspectives. The method utilizes information provided by different perspectives, and integrates these images through techniques such as panoramic stitching algorithms, so as to determine the relative positions of the missing lamp beads.

In all these embodiments, it is crucial to determine the relative positional relationship. The serial positions and the planar spatial positions of the missing lamp beads can be inferred by analyzing the distribution mode of the recognized lamp beads and the physical characteristics of the lamp chain, which ensures the integrity and accuracy of the lamp chain circling model. The method based on the relative positional relationship not only improves the accuracy in recognizing the lamp beads, but also optimizes the data processing flow, thereby enhancing the adaptability and robustness of the system to complex environments.

Through the above method, even in the case where some front lamp beads are not visible due to blockage, the serial positions and the planar spatial positions thereof can be effectively inferred, so as to ensure accurate recognition of all the front lamp beads under the image shooting perspective to the greatest extent.

In terms of constructing the lamp chain circling model, the technical advantages further demonstrated by the above embodiments include:

first of all, precise capture and mapping of the front lamp beads are realized through the advanced image processing technique and color recognition algorithm, which ensures the accuracy of the model; whether it is a single image or multiple time-sequence images, it is feasible to adapt to and accurately recognize the color features and the planar spatial positions of the lamp beads, and a high recognition rate is kept even under the circumstances of dynamic changes or blockage;

secondly, in the face of the challenge that some lamp beads are invisible due to blockage, the positions of the missing front lamp beads can be predicted and filled effectively by using the relative positional relationship of the recognized lamp beads, which enhances the robustness; at the same time, the capability of real-time processing and updating can also be ensured to meet fast-changing requirements of lighting control;

in addition, the process of recognizing the lamp beads is simplified, and the technical threshold is lowered, so that without professional knowledge, the user can determine the lamp chain circling model that corresponds to the arranged shape thereof in a more convenient and more efficient manner; with excellent extensibility, the constructed lamp chain circling model can be easily integrated into other smart lighting systems or control software, and support a broader range of application scenarios and creative expressions.

On the basis of any embodiment of the method in the present disclosure, said determining a conical model adapted to the external carrier in a spiral shape comprises:

Step S5151: performing edge detection on the external carrier in the on-site image, and determining a quadrilateral external contour that corresponds to a fractal region, around which a portion of the lamp chain circles;

To realize rapid modeling of the external carrier, the implementation can be based on at least one on-site image. Taking a single on-site image as an example, the edge detection is first performed on the external carrier in the on-site image to obtain an approximate external contour thereof.

Edge detection algorithms required to detect the on-site image can be various mature known algorithms, such as Canny and Sobel algorithms. By analyzing the on-site image by means of the edge detection algorithms, edges of the external carrier can be accurately recognized. Moreover, these edges are connected to form an approximate quadrilateral external contour.

Figure 6:
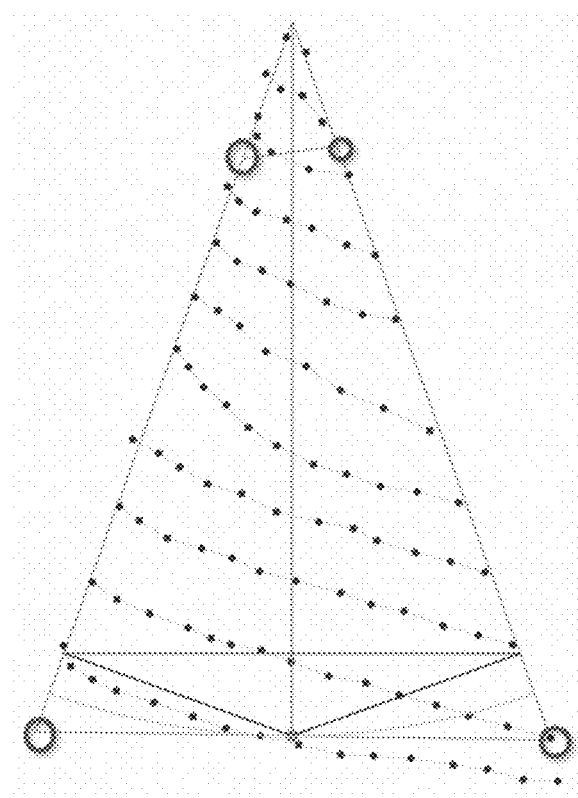
FIG. 6 is a diagram of determining a basic triangle that corresponds to front lamp beads and is required to construct a conical model in an image view space.

Referring to FIG. 6, obtained by detecting the image of the external carrier with the edge detection algorithms, four vertices, i.e., the regions defined by the four circles in the figure, are the external contour of the quadrangle that corresponds to the image of the Christmas tree. The quadrilateral contour is not only a representation of the external contour of the external carrier, but also an approximate representation of the contour enveloped by the circling path of the lamp chain on the external carrier. It captures the basic geometric features of the arrangement layout of the lamp chain. In practical operation, the edge detection algorithms are used to first analyze the on-site image and recognize regions with drastic changes in brightness, which regions usually correspond to physical boundaries of the external carrier. Subsequently, the boundary information is used to define a quadrilateral region, which provides a clear reference framework for the model construction in the next step.

In some embodiments, some external carriers may contain multiple identical fractals. For example, if a Christmas tree is designed in multiple layers, one quadrilateral contour forms one fractal at each layer, and the lamp chain circles and winds spirally along each fractal. In this case, after the edge detection algorithms are applied to carry out the detection, a corresponding quadrilateral external contour can be constructed for each fractal according to the fractal relationship. Then, based on each quadrilateral external contour, the steps of the method in the present disclosure can be executed to obtain a local lamp chain circling model that corresponds to each fractal. Finally, the complete lamp chain circling model can be obtained by combining the data of each local lamp chain circling model together.

Determining the quadrilateral contour not only provides necessary geometric information for the lamp chain circling model, but also serves as the basis for the construction of the triangular region and the spatial conversion of the conical model in the subsequent steps. Further refinement and spatial positioning of the model are fully prepared by recording the coordinates of the vertices of the quadrilateral contour.

The implementation of the edge detection algorithms enables accurate recognition of the circling region of the lamp chain under various environmental conditions, including the circumstance that the surface features of the external carrier are not conspicuous or the lighting conditions are not ideal. The robustness ensures the reliability of the modeling process and the accuracy of the model.

Step S5152: constructing a corresponding triangular region in the image view space on the basis of the external contour, and correcting the triangular region;

Common external carriers, such as a Christmas tree among other decorated objects, may be narrow at the top and wide at the bottom. Of course, other decorated objects may also be narrow at the bottom and wide at the top. The list goes on and on. The external contour thereof can roughly form an approximate trapezoid. In this case, to facilitate constructing the conical model in the modeling space, two legs of the external contour that approximates a trapezoid can be extended to intersect at the same point in the image view space, as shown in FIG. 6, so that it becomes a triangular region as the basis for constructing the conical model.

Due to the physical shape of the external contour of the external carrier or factors such as shooting perspective and graphic distortion, the obtained triangular region has irregularity, and may not be an ideal isosceles triangle. It can be approximated as an isosceles triangle to realize preliminary correction. Then, based on the triangular region that is determined on the basis of the external contour, the triangular region can be corrected continuously to construct a conical model on the basis of the corrected triangular region.

Correcting the triangular region helps ensure both the accuracy of the subsequent spatial conversion and the degree of adaptation of the conical model.

To realize further correction, as shown in FIG. 6, a perpendicular bisector can be drawn at two base angles of the triangle to the respective legs thereof. These perpendicular lines help determine the height of the triangle, and further adjust the shape and size thereof, so as to reflect the actual form of the external carrier in a more accurate manner. In addition, a perpendicular bisector can also be drawn inside the triangle to divide it into two smaller triangles, which helps to further analyze and adjust the geometric characteristics of the triangle.

Through these auxiliary lines, the triangular region can be adjusted to ensure the correct positions of the vertex and edges thereof. For example, if it is found that a certain side of the triangle is not completely aligned with the actual boundary of the external carrier, it can be corrected by moving the vertex or adjusting the side length. Likewise, if the height of the triangle does not match the height of the external carrier, it can be corrected by adjusting the position of the perpendicular line.

The corrected triangular region will become a reliable basis for constructing the conical model. Through these precise and low-cost geometric operations, a reliable and accurate starting point can be provided for the construction of the lamp chain circling model.

Step S5153: performing spatial conversion on the basis of the triangular region to construct the conical model accordingly.

According to the corrected triangular region, the correspondence in space is determined between it and the conical model to be constructed. Specifically speaking, the vertex of the triangle can correspond to that of the conical model, while the base of the triangle corresponds to a diameter on the bottom surface of the cone. Through the correspondence, each point of the triangle can be mapped to the corresponding position in the modeling space of the conical model.

Subsequently, the spatial conversion is performed, which generally include rotation and translation operations, so as to form the side surface of the cone. Specifically speaking, the side surface of the cone can be constructed by rotating the vertex of the triangle around the perpendicular bisector at the base of the triangle. The rotation angle is usually 360 degrees to ensure the continuity and integrity of the circling of the lamp chain.

In the construction process, the vertex and sides of the triangle can still be adjusted appropriately according to actual needs, so as to ensure that the geometric characteristics of the conical model match the actual circling form of the lamp chain. For example, if the external carrier has a shape that is narrow at the top and wide at the bottom, the vertex of the triangle may need to be raised or lowered appropriately, so as to simulate the inclination degree of the conical model.

In addition, to ensure the accuracy of the conical model, numerical methods can be used to calculate each point precisely in the process of the spatial conversion, which includes the use of mathematical tools such as vector operation and matrix conversion for achieving precise control over the vertex and sides of the triangle.

The significant advantages of the technical effects in the above embodiments lie in the high efficiency and computational economy thereof. In the process of determining the conical model adapted to the external carrier in a spiral shape, manners with a relatively low computational expense are used in the steps such as edge detection, triangle region correction, and spatial conversion as adopted. For example, the edge detection algorithms such as Canny and Sobel algorithms are widely used in the field of image processing due to the maturity and stability thereof. They have relatively low computational complexity, and can quickly extract the required contour information from the on-site image. Likewise, the process of correcting the triangular region achieves precise adjustment of the model shape through simple geometric transformation and the drawing of auxiliary lines, without complex mathematical modeling or considerable computing resources. In the stage of spatial conversion, the conical model is constructed by mapping the two-dimensional triangle into a three-dimensional space, which adopts intuitive rotation operations. These operations are computationally efficient, and can quickly generate a three-dimensional representation of the circling model of the lamp chain. In addition, by combining the numerical methods and the mathematical tools such as vector operation and matrix transformation, the present method ensures the precision and accuracy in the transformation process. In general, these tools and operations have been highly optimized on modern computing apparatuses, with fast execution speed and low resource consumption. When the method corresponding to the present embodiment is deployed in an embedded chip, e.g., when it is directly in a controller of an ambient lamp apparatus, the efficiency advantage thereof is more significant.

On the basis of any embodiment of the method in the present disclosure, said unfolding the conical model into a sector-shaped reference region in the image view space comprises:

Step S5210: for at least one fractal region of the external carrier, around which fractal region a portion of the lamp chain circles, unfolding the conical model that correspond to each fractal region to obtain a corresponding sector-shaped reference region;

As revealed in the previous embodiments, the external carrier may include a single or multiple fractal regions, each of which can correspond to a conical model created in the modeling space. These fractal regions, as a part of the lamp chain layout, exhibit slightly different geometrical characteristics due to the shape of the carrier, e.g., they have different scaling factors and correspond to different parts of the external carrier. To accurately represent the relative positional relationship between the lamp beads of the lamp chain and each fractal region in the image view space, a unified processing flow can be followed to unfold the conical model that corresponds to each fractal region into one sector-shaped reference area.

Step S5220: mapping one generatrix of each conical model to one side edge of the fractal region that corresponds thereto, and flattening the sector-shaped reference region that takes the generatrix as the side edge into the image view space;

The two-dimensional unfolding of the conical model in the image view space is to facilitate converting the three-dimensional form of the lamp chain to the mapping positions on the two-dimensional plane, so as to further analyze and process the further recognition of the lamp beads on the lamp chain in the image view space.

When the two-dimensional unfolding is applied to each conical model, it is done according to the geometric characteristics of the conical model. Each conical model is defined by one generatrix and one base circumference. The generatrix is a straight line from the vertex of the cone to the base circumference, while the base circumference corresponds to the distribution of the lamp chain in the fractal region. In the image view space, the unfolding of the conical model is realized by mapping the generatrix to one side edge of the fractal region of a portion of the lamp chain (as shown in FIG. 6, which can be seen as one leg of the triangle). The mapping ensures that the form of the lamp chain in the three-dimensional space can be accurately represented on the two-dimensional plane. In the previous embodiments of the present disclosure, the correspondence between before unfolding and after unfolding has also been reflected when the conical model is constructed.

In the unfolding operation, the first step is to determine the generatrix of the conical model; then, the generatrix is mapped to the side edge of the fractal region of a corresponding part of the lamp chain, i.e., the actual edge of the lamp chain corresponds to the generatrix of the conical model. In this way, the conical model can be unfolded along the generatrix into one sector-shaped reference region, one side edge of the sector-shaped reference region is the mapped generatrix, and the two other sides are determined by the distribution of the lamp chain.

Once the mapping relationship is determined, the sector-shaped reference region is flattened in the image view space in effect. This means that the unfolded sector-shaped region is placed on a two-dimensional plane, which ensures that it accurately reflects the position and form of the lamp chain in the three-dimensional space. The flattening operation allows for detailed analysis of the layout of the lamp chain in the image view space, including the relative positions of the lamp beads and the curved form of the lamp chain.

Step S5230: setting a correspondence between the generatrix and the side edge, and determining the inclined state of each conical model in the same modeling space according to the correspondence, so as to construct the lamp chain circling model.

Upon the completion of unfolding the conical model in the two-dimensional plane, the correspondence is determined between the generatrix of the conical model and the side edge of the sector-shaped reference region, which forms a benchmark. The benchmark can be stored in memory to realize settings for subsequent reference. The correspondence determines the inclined state of the conical model in the modeling space. Through the setting, it can be ensured that the inclined state of all the conical models in the modeling space is basically synchronized with that of the sector-shaped reference region in the image view space, which facilitates the subsequent construction of the lamp chain circling model that is coherent and consistent with the actual physical spatial form.

In the above embodiments, significant efficiency advantages are demonstrated by mapping the fractal regions of parts of the lamp chain into the conical models and unfolding them into sector-shaped reference regions in the image view space, especially in terms of the adaption to the structural complexity of the external carrier. The present disclosure allows for individual processing of each fractal region, thereby ensuring accurate representation of the three-dimensional form of the lamp chain on the two-dimensional plane, regardless of changes in the shape of the carrier. Through the unified processing flow, the sector-shaped reference regions can be efficiently generated for each part of the lamp chain, which ensures the continuity and integrity of the lamp chain layout. In addition, by setting the correspondence between the generatrix and the side edge, not only is the modeling process simplified, but also the accuracy of the model is improved, so that the construction of the lamp chain circling model is more direct and more precise. With both universality and flexibility, the method can be adapted to carriers in various complex shapes, so as to significantly improve the efficiency and accuracy in generating the lamp chain circling model.

On the basis of any embodiment of the method in the present disclosure, said arranging multiple circles of rear lamp beads on the surface of the sector-shaped reference region according the missing number of the multiple circles of rear lamp beads on the lamp chain outside the image shooting perspective, and determining sector-shaped spatial positions of all the lamp beads in the sector-shaped reference region comprises:

Step S5310: determining the missing number of corresponding rear lamp beads in one circle according to serial positions that correspond to two opposite front lamp beads of every two adjacent rows of front lamp beads of the lamp chain on a circling path in the sector-shaped reference region;

Since the on-site image only displays the light-emitting information provided by the front lamp beads and fails to display the light-emitting information of the rear lamp beads, the identities and positions of the rear lamp beads need to be obtained through technical analysis. By analyzing the identity and position of each rear lamp bead, it can be ensured that the complete physical layout of the lamp chain can be precisely represented in the image view space, and even parts outside the image shooting perspective can be handled properly.

Specifically speaking, the positional relationship between every two adjacent rows of front lamp beads in the sector-shaped reference region of the lamp chain needs to be recognized first. The front lamp beads refer to lamp beads that are directly visible in the image view space, while the rear lamp beads are not visible perhaps due to the limited perspective. By analyzing the relative positions of the front lamp beads on the circling path, the missing situation of the rear lamp beads can be inferred. The circling path refers to the trajectory of the lamp chain winding around the external carrier, and the serial position relationship between every two rows of front lamp beads is the corresponding positions thereof relative to each other on the circling path.

During the specific implementation, the front lamp beads in the determined positions in the image view space are recognized first. These lamp beads are arranged in serial positions, and form multiple rows. Moreover, the serial positions of each row of lamp beads have been identified through serial number. For every two adjacent rows of front lamp beads, the serial positions of the lamp beads at the end thereof in respective connection with a row of lamp beads on the rear side are known. By using the information, the number of missing rear lamp beads between the two rows of front lamp beads can be inferred. For example, if the serial position of the first row of front lamp beads is known as Pm and the serial position of the second row of front lamp beads is known as Pn, the number of missing rear lamp beads between the two rows of front lamp beads can be obtained by calculating the difference value between Pn and Pm.

Step S5320: extending a reference line between the two opposite front lamp beads on the surface of the sector-shaped reference region according to the missing number, setting multiple rear lamp beads that correspond to the missing number on the reference line, and arranging them on the surface of the sector-shaped reference region;

After the missing number of each row of rear lamp beads is determined, the identities and positions of each row of rear lamp beads can be inferred according to the missing number. During the specific implementation, the operation is carried out along a reference connection line between the two adjacent rows of front lamp beads as recognized on the surface of the sector-shaped reference region. The reference connection line is a virtual line connecting the lamp beads at the ends of the two rows of front lamp beads. It is a corresponding line segment that is obtained by extending in the sector-shaped reference region, can be obtained by extending on the basis of the corresponding end of any row of front lamp beads, and serve as the basis for arranging the rear lamp beads. According to the missing number as calculated previously, the corresponding missing number of rear lamp beads are arranged at equal intervals on the reference connection line.

For example, if the calculation results show that N lamp beads are missing between two rows of front lamp beads, N rear lamp beads can be arranged at equal intervals on the circling path shown by the reference connection line according to the physical characteristics and design patterns of the lamp chain. By arranging the rear lamp beads on the circling path, it is ensured that the arrangement of the lamp beads in the sector-shaped reference region matches the actual winding form of the lamp chain.

Figure 7:
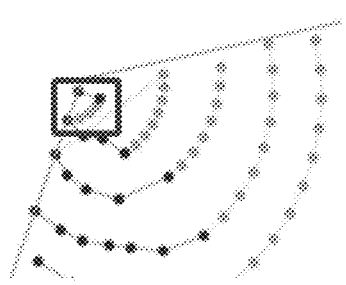
FIG. 7 is a diagram of adding a missing number of lamp beads near the circle center of the sector-shaped reference region.

In some other embodiments, the intervals between every two adjacent rows of front lamp beads in the serial positions can be first determined according to the planar spatial positions of all the front lamp beads. Then, the average interval of the lamp beads is calculated according to these intervals. Corresponding to the missing number, the length of the inferred lamp chain segment is obtained in combination with the product obtained by multiplying the average interval of the lamp beads by the sum of the missing number and 1. If the length is greater than that of the reference connection line as determined in the above way, and the planar spatial positions of other front lamp beads are not closer to the circle center of the sector-shaped reference region than the planar spatial positions of these two rows of front lamp beads, then a connection line can be drawn directly between these two rows of front lamp beads in the order of the serial positions, regardless of whether the connection line spans the entire sector-shaped reference region. Finally, the missing lamp beads can be arranged on the connection line. For the effect thereof, see the box as shown in FIG. 7.

If the external carrier, around which the lamp chain winds, has multiple fractal regions, a sector-shaped reference region can be established individually for each fractal region, and the arrangement of the rear lamp beads can be carried out individually. In this way, no matter how complex the form of the lamp chain is, the positions of all the lamp beads can be determined accurately in the method, so as to ensure the integrity and accuracy of the lamp chain circling model.

Step S5330: determining the corresponding serial positions of the rear lamp beads in the order thereof on the circling path, and mapping them to the sector-shaped spatial positions thereof in the sector-shaped reference region.

It is not difficult to understand that since the serial positions of the front lamp beads has been identified through the serial number, the serial positions of the rear lamp beads sandwiched between two rows of front lamp beads can be inferred on the circling path. For example, if it is known that Pn and Pm are the serial position identifiers of the lamp beads opposite to each other at the end of two rows of front lamp beads, and the difference value N therebetween represents the missing number of rear lamp beads, then the serial positions of these rear lamp beads can be sequentially increased from Pn+1 to Pn+N, so as to ensure that each rear lamp bead is set to have a distinctive position code, so as to correspond to the serial position in the lamp chain.

On the other hand, the spatial positions of the rear lamp beads can also be determined in the sector-shaped reference region. Since these rear lamp beads have been arranged at appropriate positions in the sector-shaped reference region, the sector-shaped spatial position of each rear lamp bead can be determined through a polar coordinate system.

As can be seen, by mapping the serial position of each rear lamp bead to the sector-shaped spatial position thereof, not only can the order thereof on the lamp chain be determined, but also the spatial position thereof can be known precisely.

The above embodiments significantly improve the efficiency and accuracy in inferring the positions of the rear lamp beads. First of all, by utilizing the known information provided by the front lamp beads, the missing number of rear lamp beads can be directly determined by calculating the difference value between the serial positions. The process avoids complex image analysis and simplifies the technical flow. Next, in the sector-shaped reference region, the uniformity and consistency of the layout are ensured by extending the reference connection line between the front lamp beads and arranging the missing rear lamp beads at equal intervals. In addition, by applying the polar coordinate system, one accurate sector-shaped spatial position is provided for each rear lamp bead, so as to further enhance the spatial positioning capability of the model. Ultimately, the clear establishment of the mapping relationship between the serial positions and the spatial positions not only ensures the integrity of the lamp chain model, but also provides an effective means for quickly inferring all the rear lamp beads outside the image shooting perspective. The advantage of the method lies in the high level of systematicity and automation thereof, which drastically reduces manual operations and potential errors, and improves the overall processing speed and efficiency. When the method is deployed in the ambient lamp apparatus that uses an embedded chip, the efficiency advantage thereof is particularly significant.

On the basis of any embodiment of the method in the present disclosure, said setting multiple rear lamp beads that correspond to the missing number on the reference line and arranging them on the surface of the sector-shaped reference region comprises:

Step S5321: creating a polar coordinate system for describing the sector-shaped reference region, wherein one side edge of the sector-shaped reference region serves as a polar axis;

The purpose of creating the polar coordinate system is to convert the two-dimensional planar positions of the lamp beads in the image view space to the sector-shaped spatial positions in the sector-shaped reference region; as such, through convenient and fast calculation, the planar spatial position of each lamp bead in the lamp chain can be finally mapped into the modeling space where the conical model is located, and the corresponding stereoscopic spatial positions can be obtained, so as to realize the precise and fast switch between the two-dimensional representation of the positions of the lamp beads and the three-dimensional representation thereof.

In the polar coordinate system, the polar axis is a reference line, and all the positional information will be measured with the polar axis as a benchmark. By establishing the polar coordinate system, each point in the sector-shaped reference region can be converted to the form of polar coordinates. The form includes two components: polar radius and polar angle. The polar radius is the straight-line distance from the polar axis to a point, i.e., a lamp bead, while the polar angle is the angle between the straight line and the polar axis. The two components together define the exact position of the point in the sector-shaped reference region.

For example, if the sector-shaped reference region represents the lamp bead layout region of one lamp chain that winds around a Christmas tree, then the polar axis can be one side edge of the sector-shaped reference region, and corresponds to one generatrix of the conical model that corresponds to the Christmas tree. As the coordinate system is constructed in this way, each lamp bead on the lamp chain can be endowed with unique polar coordinates according to the position thereof relative to the polar axis.

Step S5322: converting the planar spatial positions of the lamp beads in the image view space to the sector-shaped spatial positions in the sector-shaped reference region on the basis of the polar coordinate system, wherein the sector-shaped spatial positions of the lamp beads in the sector-shaped reference region is determined by taking a connecting line segment from a lamp bead to a circle center of the sector-shaped reference region as a polar radius, and an angle between the connecting line segment and the side edge as a polar angle;

The lamp beads and the sector-shaped reference region are both located in the image view space. Therefore, both the lamp beads and the sector-shaped reference region per se have relative representation information of the corresponding planar spatial positions thereof in the same image view space. To represent the sector-shaped spatial positions of the lamp beads relative to the entire sector-shaped reference region, they need to be re-represented as a polar coordinate formula based on the polar coordinate system that corresponds to the sector-shaped reference region, and the corresponding sector-shaped spatial positions are obtained, so as to realize the conversion from the planar spatial positions of the lamp beads to the sector-shaped spatial positions of the lamp beads in the coordinate space provided by the sector-shaped reference region.

A specific example is used to illustrate the process of converting the planar spatial positions of the lamp beads to the sector-shaped spatial positions, suppose a lamp chain winds around a Christmas tree, a part of the lamp chain is visible in the image view space, thereby forming one sector-shaped reference region. One side edge of the sector-shaped reference region is selected as a polar axis of the polar coordinate system.

As for a specific lamp bead A, it is located in the sector-shaped reference region, but not directly on the polar axis. In the image view space, the lamp bead A has one two-dimensional plane position, represented by a coordinate point (x, y) in a rectangular coordinate system. To convert the position to a sector-shaped spatial position in the sector-shaped reference region, the following steps can be executed:

first of all, one straight line is drawn from the circle center O of the sector-shaped reference region to the lamp bead A, and the length of the line segment is the polar radius r; in the rectangular coordinate system, if the coordinates of the circle center O are (0, 0) and those of the planar spatial positions of the lamp beads are (x, y), then the polar radius r can be calculated through the Pythagorean theorem: $r=\sqrt{x^2+y^2}$.

Next, the angle θ between the line segment from the circle center O to the lamp bead A and the polar axis, i.e. the polar angle, is determined; if the polar axis is horizontal, the polar angle can be obtained by calculating the angle between the line segment OA and the horizontal direction; in the rectangular coordinate system, the polar angle can be calculated through the arctangent function:

$$\theta = \arctan\left(\frac{y}{x}\right);$$

if x is a negative value, the final value of the polar angle can be adjusted according to the orientation of the polar axis;

with the polar radius r and the polar angle θ, the position of the lamp bead A can be converted from the point (x, y) in the rectangular coordinate system to a point (r, θ) in the polar coordinate system; at this point, the polar coordinate point (r, θ) represents the sector-shaped spatial position of the lamp bead A in the sector-shaped reference region.

Through the above conversion process, it is not difficult to understand that based on the independently added polar coordinate system, not only can one precise spatial position can be provided for each lamp bead in the sector-shaped reference region, but also it can be ensured that the complete physical layout of the lamp chain can be represented digitally in the image view space in an accurate manner.

Step S5323: setting the sector-shaped spatial positions and the serial positions of multiple rear lamp beads uniformly in the same reference line according to the missing number on the basis of the polar coordinate system.

The missing rear lamp beads are subjected to uniform-distribution setting on the reference connection line, so as to ensure that they are arranged uniformly and orderly on the surface of the sector-shaped reference region. The key is to use the polar angle of the polar coordinate system to uniformly distribute the lamp beads, thereby ensuring that each lamp bead occupies the same spatial region, and realizing the visual consistency and the physical layout uniformity.

Taking the lamp chain for the Christmas tree as mentioned above as an example again, suppose that front lamp beads A and B have been recognized, and they are located at both ends of the reference connection line. Polar coordinates (rA, θA) and (rB, θB) have been assigned to them through the polar coordinate system. Now, N−1 missing rear lamp beads need to be uniformly distributed between these two lamp beads.

Firstly, the difference value between the polar angles θB and θA is calculated, which will provide the polar angle span of the entire zone. Then, the angle is divided into N equal parts, each representing a polar angle interval of one missing lamp bead. If θB>θA, then the polar angle interval of each part is (θB−θA)/N. If θA>θB, it indicates that the lamp beads are arranged in a counterclockwise direction, and the polar angle interval can be adjusted to (θA−θB+360°)/N to ensure the correct arrangement of the lamp beads on the circumference.

Next, starting from the polar coordinates of the lamp bead A, each missing rear lamp bead is arranged in sequence in the polar angle interval direction. As for each new lamp bead, the polar coordinates thereof are determined by using the polar angle of the previous lamp bead plus the polar angle interval. At the same time, one proper polar radius value can be selected for each lamp bead. For example, the average polar radius of the lamp beads A and B can be selected as the polar radius of the missing lamp beads; alternatively, corresponding to each rear lamp bead, there is a gradient increase (decrease) from the polar radius value of the lamp bead A to the polar radius value of the lamp bead B.

In the above manner, it is ensured that all the rear lamp beads are uniformly arranged along the reference connection line, which not only realizes a visually pleasing effect, but also achieves precise control over the physical layout. The process of uniform-distribution setting in combination with the use of polar coordinate system provides an efficient method to quickly and accurately arrange the missing lamp beads, thereby completing the construction of the lamp chain circling model.

According to the principle of uniform distribution, in some embodiments, fine adjustment can be systematically made to the interval between all the front and rear lamp beads in the sector-shaped reference region, i.e., the fine adjustment can be made to the interval between every two adjacent lamp beads in the sector-shaped reference region on the entire circling path of the lamp chain, which is reflected in the fact that the polar angles of all the lamp beads are adjusted to be equal, so that the distribution of the lamp beads in the circling model of the lamp chain has a more uniform effect.

By introducing the polar coordinate system to optimize the generation process of the lamp chain circling model, technical advantages have been demonstrated in multiple aspects, e.g.:

first of all, as the positions of the lamp beads are calculated by using the polar coordinate system that is independently constructed on the basis of the sector-shaped reference region, the calculation efficiency is greatly improved; in the polar coordinate system, the positions of the lamp beads are concisely represented by two parameters: the polar radius and the polar angle, which reduces the complexity of coordinate conversion and simplifies the calculation process as compared with the traditional rectangular coordinate system;

secondly, the layout accuracy is improved by using the polar coordinate system; in the sector-shaped reference region, the lamp beads are subjected to uniform-distribution setting by equalizing the polar angles, so as to ensure the uniform distribution of the lamp beads visually and physically; the method reduces differences in the lighting effect as caused by non-uniform layout, so as to ensure the consistency in the lighting design and the achievement of the expected effects;

furthermore, the cost of the apparatus is reduced by applying the polar coordinate system; since the polar coordinate system is more suitable for handling circular and radial distributions, it reduces the reliance on high-precision rotation or displacement sensors, thereby lowering the overall system cost; in addition, the simplified calculation process also reduces requirements on computing hardware, is more suitable for embedded chips, and further reduces the cost;

in addition, the above embodiments also demonstrate the flexibility and adaptability in the arrangement of the lamp chain; the polar coordinate system can provide effective solutions for both a simple spiral lamp chain and a complex layout where the lamp chain winds around a carrier in an irregularly shape; due to the flexibility, the present disclosure can be widely applied to different lighting scenarios and design requirements;

finally, as the fine adjustment is systematically made to the interval through the polar coordinate system, the uniformity of the distribution of the lamp beads is further improved in the lamp chain circling model; the fine adjustment not only optimizes the lighting effect, but also provide the possibility of realizing more complex dynamic lighting, thereby enhancing the controllability and expressiveness of the lighting system.

On the basis of any embodiment of the method in the present disclosure, said mapping the sector-shaped spatial positions of the lamp beads on the surface of the sector-shaped reference region to corresponding stereoscopic spatial positions in a modeling space where the conical model is located comprises:

Step S5410: obtaining a correspondence for carrying out spatial conversion between the polar coordinate system correspondingly constructed according to the sector-shaped reference region and the modeling space where the conical model is located;

In the previous explanation of the embodiments that involve unfolding the conical model in the image view space, the correspondence has been revealed between one generatrix of the conical model and one side edge of the sector-shaped reference region that corresponds thereto. The correspondence can ensure the accurate mapping between the sector-shaped reference region and the conical model. The correspondence has already been created and stored in advance, and can be directly called in the present step.

Step S5420: converting the sector-shaped spatial positions of the lamp beads in the sector-shaped reference region to the three-dimensional spatial positions of the modeling space according to the correspondence;

According to the correspondence as mentioned above, the mapping relationship is established between one generatrix of the conical model and one side edge of the sector-shaped reference region. The mapping relationship allows for the conversion from the two-dimensional position information represented with polar coordinates in the sector-shaped reference region to the stereoscopic spatial positions on the conical model.

First of all, the spatial positions of all the lamp beads need to be determined in the sector-shaped reference region, and these positions have been provided in the form of polar radiuses and polar angles in a polar coordinate system. Then, by using the determined correspondence, these two-dimensional polar coordinates are converted to three-dimensional spatial coordinates. The conversion process relates to the use of mathematical coordinate conversion means, and usually can be realized through coordinate conversion formulas or matrix calculations.

For example, suppose that the polar coordinates of the lamp bead A in the sector-shaped reference region are $(r, \theta)$, wherein r is the straight-line distance from a lamp bead to the circle center of the sector-shaped reference region, i.e. the polar radius, and $\theta$ is the angle between the straight line and the polar axis. By using the correspondence between the generatrix of the conical model and the side edge of the sector-shaped reference region, the position of the lamp bead A on the conical model can be determined. Specifically speaking, the polar coordinates $(r, \theta)$ can be converted to three-dimensional coordinates $(x, y, z)$ in the modeling space where the conical model is located. The conversion process may be as follows:

the polar radius r and polar angle $\theta$ are first used to calculate the position of a lamp bead on the side surface of the conical model according to the geometric characteristics of the conical model; then, the height of the lamp bead on the z-axis is determined according to the height of the conical model and the position of the lamp bead on the side surface of the cone; considering that the modeling space is generated by directly extending by one dimension on the basis of the image view space, the coordinates of the lamp bead on the x-axis and y-axis in the modeling space can approximately adopt the corresponding values in the image view space; as such, the coordinates $(x, y, z)$ of the lamp bead A can be obtained in the three-dimensional space, and represent the specific position of the lamp bead in the conical model.

Step S5430: constructing the serial positions and the three-dimensional spatial positions of the lamp beads in the lamp chain into the lamp chain circling model to be stored or displayed.

Through the above process, all the lamp beads in the sector-shaped reference region can be converted into the three-dimensional space of the conical model. Each lamp bead has a one-to-one mapping relationship determined between the serial position, the planar spatial position, the sector-shaped spatial position, and the three-dimensional spatial position thereof. The mapping relationship can be represented, stored, and displayed in the form of structured data. For example, it can be represented in any form such as relational tables and key-value pair data. After the data representation, it can be stored as a file, or parsed and displayed as a model image in the graphical user interface as shown in FIG. 5. To sum up, as long as the serial position of each lamp bead in the lamp chain is associated with and mapped to the corresponding stereoscopic spatial position thereof, the corresponding lamp chain circling model on the external carrier can be obtained.

The technical advantages of the present embodiment are mainly concentrated on such aspects as improving the modeling efficiency, enhancing the model precision, and comprehensively improving the user experience and application potential, e.g.:

first of all, in terms of improving the modeling efficiency, the present embodiment benefits from unfolding the conical model into a sector-shaped reference region and creating a polar coordinate system in the region, thereby greatly simplifying the spatial positioning process of the lamp beads; as the method makes use of the natural adaptability of the polar coordinate system, the positions of the lamp beads can be determined just through the polar radius and polar angle, so as to reduce the complex calculation required by the traditional three-dimensional spatial modeling; moreover, by establishing the correspondence in advance, the spatial conversion from the sector-shaped reference region to the conical model can be completed quickly, which significantly improves the speed of the conversion from the two-dimensional plane to the three-dimensional stereoscopic model;

secondly, in terms of enhancing the model precision, the polar coordinate system mapping method of the present embodiment provides precise spatial positioning for each lamp bead; in the polar coordinate system, the positions of the lamp beads are accurately represented by polar radiuses and polar angles, which can ensure that the position information of each lamp bead is accurate even when the lamp chain winds around a complex or irregular carrier; moreover, by mapping the two-dimensional position information of the sector-shaped reference region back to the three-dimensional conical model, the present embodiment can ensure that the geometric form of the lamp chain circling model is highly consistent with the actual physical layout, thereby improving the precision and reliability of the model;

finally, in terms of comprehensively improving the user experience and application potential, the method of the present embodiment simplifies the construction process of the lamp chain circling model, so that the user, without professional knowledge, can readily design personalized lighting effects; the intuitiveness and usability of the method greatly lower the threshold for use of smart lighting systems, so that more consumers can enjoy the pleasure of the personalized lighting design; at the same time, the efficient and precise modeling capability of the present embodiment provides broad space for the application scope and innovative potential of the smart lighting systems, and can play a vital role whether in home decoration, commercial lighting, artistic creation or the like.

Figure 8:
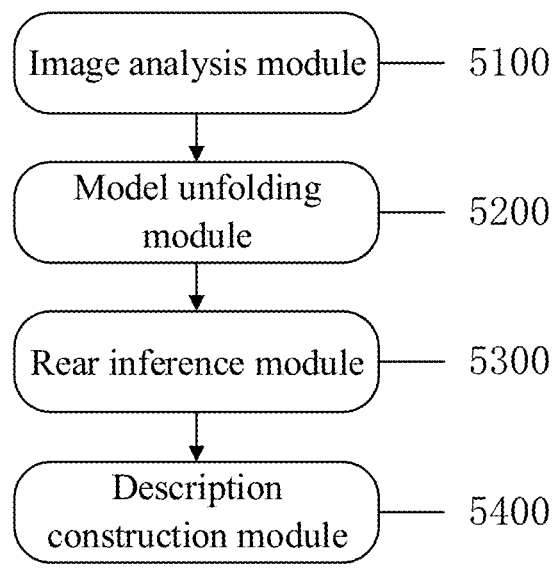
FIG. 8 is a structure diagram of a device for constructing a lamp chain circling model in the embodiments of the present disclosure.

Referring to FIG. 8, another embodiment of the present disclosure further provides a device for constructing a lamp chain circling model, which comprises an image analysis module 5100, a model unfolding module 5200, a rear inference module 5300, and a description construction module 5400. Wherein, the image analysis module 5100 is configured to obtain an on-site image of a lamp chain that spirally circles around an external carrier, determine planar spatial positions of front lamp beads of the lamp chain in an image view space under an image shooting perspective, and determine a conical model adapted to the external carrier in a spiral shape; the model unfolding module 5200 is configured to unfold the conical model into a sector-shaped reference region in the image view space, so that each front lamp bead is located on the surface of the sector-shaped reference region according to the planar spatial position of each front lamp bead; the rear inference module 5300 is configured to arrange multiple circles of rear lamp beads on the surface of the sector-shaped reference region according the missing number of the multiple circles of rear lamp beads on the lamp chain outside the image shooting perspective, and determine sector-shaped spatial positions of all the lamp beads in the sector-shaped reference region; the description construction module 5400 is configured to map the sector-shaped spatial positions of the lamp beads on the surface of the sector-shaped reference region to corresponding stereoscopic spatial positions in a modeling space where the conical model is located, and obtain the lamp chain circling model.

On the basis of any embodiment of the device in the present disclosure, the image analysis module 5100 comprises: a view space construction module, which is configured to construct the image view space that corresponds to the on-site image; a view position recognition module, which is configured to use one or more on-site images, recognize both unique color features provided by the lamp beads and the planar spatial positions thereof in the image view space; a lamp bead identity recognition module, which is configured to query a preset color display instruction list, determine serial positions of the lamp beads that correspond to the unique color features in the lamp chain, and map the planar spatial positions to the serial positions; a front missing completion module, which is configured to determine those lamp beads that lack the unique color features in the image view space, and determine the serial positions and the planar spatial positions of those lamp beads according to relative positional relationship between those lamp beads and the lamp beads that have been subjected to establishment of the mapping, so as to obtain the serial positions and the planar spatial positions of all the front lamp beads.

On the basis of any embodiment of the device in the present disclosure, the image analysis module 5100 comprises: a sub-region contour recognition module, which is configured to perform edge detection on the external carrier in the on-site image, and determine a quadrilateral external contour that corresponds to a fractal region, around which a portion of the lamp chain circles; a contour model correction module, which is configured to construct a corresponding triangular region in the image view space on the basis of the external contour, and correct the triangular region; a conical model creation module, which is configured to perform spatial conversion on the basis of the triangular region to construct the conical model accordingly.

On the basis of any embodiment of the device in the present disclosure, the model unfolding module 5200 comprises: multiple region coordination modules, which are configured to, for at least one fractal region of the external carrier, around which fractal region a portion of the lamp chain circles, unfold the conical model that correspond to each fractal region to obtain a corresponding sector-shaped reference region; a spatial dimension alignment module, which is configured to map one generatrix of each conical model to one side edge of the fractal region that corresponds thereto, and flattening the sector-shaped reference region that takes the generatrix as the side edge into the image view space; an alignment relationship temporary storage module, which is configured to set a correspondence between the generatrix and the side edge, and determine the inclined state of each conical model in the same modeling space according to the correspondence, so as to construct the lamp chain circling model.

On the basis of any embodiment of the device in the present disclosure, the rear inference module 5300 comprises: a missing number analysis module, which is configured to determine the missing number of corresponding rear lamp beads in one circle according to serial positions that correspond to two opposite front lamp beads of every two adjacent rows of front lamp beads of the lamp chain on a circling path in the sector-shaped reference region; a rear lamp bead deployment module, which is configured to map one generatrix of each conical model to one side edge of the fractal region that corresponds thereto, and flatten the sector-shaped reference region that takes the generatrix as the side edge into the image view space; a rear lamp bead mapping module, which is configured to determine the corresponding serial positions of the rear lamp beads in the order thereof on the circling path, and map them to the sector-shaped spatial positions thereof in the sector-shaped reference region.

On the basis of any embodiment of the device in the present disclosure, the rear lamp bead layout module comprises: a polar coordinate system creation module, which is configured to create a polar coordinate system for describing the sector-shaped reference region, wherein one side edge of the sector-shaped reference region serves as a polar axis; a lamp bead positioning module, which is configured to convert the planar spatial positions of the lamp beads in the image view space to the sector-shaped spatial positions in the sector-shaped reference region on the basis of the polar coordinate system, wherein the sector-shaped spatial positions of the lamp beads in the sector-shaped reference region is determined by taking a connecting line segment from a lamp bead to a circle center of the sector-shaped reference region as a polar radius, and an angle between the connecting line segment and the side edge as a polar angle; a sector-shaped position setting module, which is configured to set the sector-shaped spatial positions and the serial positions of multiple rear lamp beads uniformly in the same reference line according to the missing number on the basis of the polar coordinate system.

On the basis of any embodiment of the device in the present disclosure, the description construction module 5400 comprises: a mapping relationship acquisition module, which is configured to obtain a correspondence for carrying out spatial conversion between the polar coordinate system correspondingly constructed according to the sector-shaped reference region and the modeling space where the conical model is located; a coordinate representation conversion module, which is configured to convert the sector-shaped spatial positions of the lamp beads in the sector-shaped reference region to the three-dimensional spatial positions of the modeling space according to the correspondence; a model construction output module, which is configured to construct the serial positions and the three-dimensional spatial positions of the lamp beads in the lamp chain into the lamp chain circling model to be stored or displayed.

Figure 9:
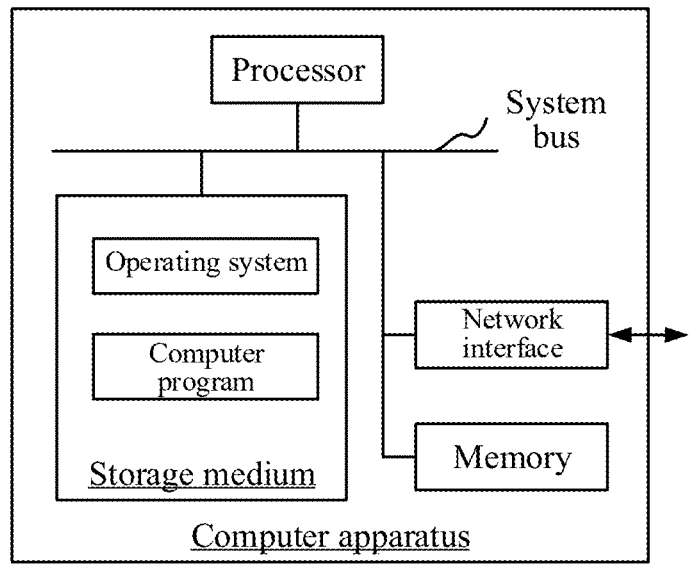
FIG. 9 is a structure diagram of a computer apparatus in the embodiments of the present disclosure.

On the basis of any embodiment of the present disclosure, referring to FIG. 9, another embodiment of the present disclosure further provides a computer apparatus that can be used as a controller in an ambient lamp apparatus. FIG. 9 is an internal structure diagram of the computer apparatus. The computer apparatus comprises a processor, a computer-readable storage medium, a memory, and a network interface that are connected through a system bus. Wherein, an operating system, a database, and a computer program, in which computer-readable instructions are encapsulated, are stored in the computer-readable storage medium of the computer apparatus, control information sequences are stored in the database, and the computer-readable instructions can cause the processor to implement a method for constructing a lamp chain circling model when executed by the processor. The processor of the computer apparatus is used to provide computing and control capabilities, in support of the operation of the entire computer apparatus. The computer-readable instructions may be stored in the memory of the computer apparatus, and the computer-readable instructions can cause the processor to execute the method for constructing the lamp chain circling model in the present disclosure when executed by the processor. The network interface of the computer apparatus is used for connection and communication with the terminal. Persons skilled in the art can understand that the structure shown in FIG. 9 is only a structure block diagram of parts relevant to the solution of the present disclosure, and does not constitute a limitation on the computer apparatus, to which the solution of the present disclosure is applied. The specific computer apparatus may comprise more or fewer parts than those shown in the figure, or combine certain parts, or is different in the arrangement of parts.

In the present manner of implementation, the processor is used to execute the specific functions of various modules and sub-modules thereof in FIG. 8, and program codes and various types of data required to execute the above modules or sub-modules are stored in the memory. The network interface is used for data transmission to user terminals or between servers. In the present manner of implementation, the program codes and data required to execute all the modules/sub-modules in the device for constructing a lamp chain circling model in the present disclosure are stored in the memory, and the servers can call the program codes and data of the servers to execute the functions of all the sub-modules.

The present disclosure further provides a storage medium, in which computer-readable instructions are stored. When executed by one or more processors, the computer-readable instructions cause one or more processors to execute the steps in the method for constructing a lamp chain circling model in any embodiment of the present disclosure.

The present disclosure further provides a computer program product, which comprises computer programs/instructions that, when executed by one or more processors, implement the steps of the method for constructing a lamp chain circling model in any embodiment of the present disclosure.

What is claimed is:

1. A method for constructing a lamp chain circling model, comprising:
    obtaining an on-site image of a lamp chain that spirally circles around an external carrier, determining a planar spatial position of each front lamp bead of the lamp chain in an image view space under an image shooting perspective, and determining a conical model adapted to the external carrier in a spiral shape;
    unfolding the conical model into a sector-shaped reference region in the image view space, so that each front lamp bead is located on the surface of the sector-shaped reference region according to the planar spatial position of each front lamp bead;
    arranging each circle of rear lamp beads on the surface of the sector-shaped reference region according to the missing number of each circle of rear lamp beads on the lamp chain outside the image shooting perspective, and determining sector-shaped spatial positions of all the lamp beads in the sector-shaped reference region, comprising: using known information provided by the front lamp beads within the image shooting perspective, to calculate a difference value of serial positions of the front lamp beads and determine the missing number of the rear lamp beads; extending a reference connection line between the front lamp beads and arranging missing number of rear lamp beads at equal intervals in the sector-shaped reference region; applying a polar coordinate system, and providing a corresponding sector-shaped spatial position for each of the rear lamp beads;
    mapping the sector-shaped spatial positions of the lamp beads on the surface of the sector-shaped reference region to corresponding stereoscopic spatial positions in a modeling space where the conical model is located, and obtaining the lamp chain circling model.

2. The method for constructing a lamp chain circling model according to claim 1, wherein said determining a planar spatial position of each front lamp beads of the lamp chain in an image view space under an image shooting perspective comprises:
    constructing the image view space that corresponds to the on-site image;
    using one or more on-site images to recognize both unique color feature provided by each lamp bead and the planar spatial positions thereof in the image view space;
    querying a preset color display instruction list to determine the serial positions of the lamp beads that correspond to the unique color features in the lamp chain, and mapping the planar spatial positions to the serial positions;
    determining part of lamp beads that lack the unique color features in the image view space, and determining the serial positions and the planar spatial positions of the part of lamp beads according to relative positional relationship between those lamp beads and the lamp beads that have been subjected to establishment of the mapping, so as to obtain the serial positions and the planar spatial positions of all the front lamp beads.

3. The method for constructing a lamp chain circling model according to claim 1, wherein said determining a conical model adapted to the external carrier in a spiral shape comprises:
 performing edge detection on the external carrier in the on-site image, and determining a quadrilateral external contour that corresponds to a fractal region, around which a portion of the lamp chain circles;
 constructing a corresponding triangular region in the image view space on the basis of the external contour, and correcting the triangular region;
 performing spatial conversion on the basis of the triangular region to construct the conical model accordingly.

4. The method for constructing a lamp chain circling model according to claim 3, wherein said unfolding the conical model into a sector-shaped reference region in the image view space comprises:
 for at least one fractal region of the external carrier, around which fractal region a portion of the lamp chain circles, unfolding the conical model that correspond to each fractal region to obtain a corresponding sector-shaped reference region;
 mapping one generatrix of each conical model to one side edge of the fractal region corresponding thereto, and flattening the sector-shaped reference region that takes the generatrix as the side edge into the image view space;
 setting a correspondence between the generatrix and the side edge, and determining the inclined state of each conical model in the same modeling space according to the correspondence, so as to construct the lamp chain circling model.

5. The method for constructing a lamp chain circling model according to claim 1, wherein said arranging each circle of rear lamp beads on the surface of the sector-shaped reference region according the missing number of each circle of rear lamp beads on the lamp chain outside the image shooting perspective, and determining sector-shaped spatial positions of all the lamp beads in the sector-shaped reference region comprises:
 determining the missing number of corresponding rear lamp beads in one circle according to the serial positions that correspond to two opposite front lamp beads of every two adjacent rows of front lamp beads of the lamp chain on a circling path in the sector-shaped reference region;
 extending the reference connection line between the two opposite front lamp beads on the surface of the sector-shaped reference region according to the missing number, setting multiple rear lamp beads that correspond to the missing number on the reference connection line, and arranging them on the surface of the sector-shaped reference region;
 determining the corresponding serial positions of the rear lamp beads in the order thereof on the circling path, and mapping them to the sector-shaped spatial positions thereof in the sector-shaped reference region.

6. The method for constructing a lamp chain circling model according to claim 5, wherein said setting multiple rear lamp beads that correspond to the missing number on the reference line, and arranging them on the surface of the sector-shaped reference region comprises:
 creating a polar coordinate system for describing the sector-shaped reference region, wherein one side edge of the sector-shaped reference region serves as a polar axis;
 converting the planar spatial positions of the lamp beads in the image view space to the sector-shaped spatial positions in the sector-shaped reference region on the basis of the polar coordinate system, wherein the sector-shaped spatial positions of the lamp beads in the sector-shaped reference region is determined by taking a connecting line segment from a lamp bead to a circle center of the sector-shaped reference region as a polar radius, and an angle between the connecting line segment and the side edge as a polar angle;
 setting the sector-shaped spatial positions and the serial positions of multiple rear lamp beads uniformly in the same reference line according to the missing number on the basis of the polar coordinate system.

7. The method for constructing a lamp chain circling model according to claim 1, wherein said mapping the sector-shaped spatial positions of the lamp beads on the surface of the sector-shaped reference region to corresponding stereoscopic spatial positions in a modeling space where the conical model is located comprises:
 obtaining a correspondence for carrying out spatial conversion between a polar coordinate system correspondingly constructed according to the sector-shaped reference region and the modeling space where the conical model is located;
 converting the sector-shaped spatial positions of the lamp beads in the sector-shaped reference region to the three-dimensional spatial positions of the modeling space according to the correspondence;
 constructing the serial positions and the three-dimensional spatial positions of the lamp beads in the lamp chain into the lamp chain circling model to be stored or displayed.

8. A device for constructing a lamp chain circling model, comprising:
 an image analysis module, which is configured to obtain an on-site image of a lamp chain that spirally circles around an external carrier, determine planar spatial positions of front lamp beads of the lamp chain in an image view space under an image shooting perspective, and determine a conical model adapted to the external carrier in a spiral shape;
 a model unfolding module, which is configured to unfold the conical model into a sector-shaped reference region in the image view space, so that each front lamp bead is located on the surface of the sector-shaped reference region according to the planar spatial position of each front lamp bead;
 a rear inference module, which is configured to arrange each circle of rear lamp beads on the surface of the sector-shaped reference region according the missing number of each circle of rear lamp beads on the lamp chain outside the image shooting perspective, and determine sector-shaped spatial positions of all the lamp beads in the sector-shaped reference region, comprising: using known information provided by the front lamp beads within the image shooting perspective, to calculate a difference value of serial positions of the front lamp beads, and determine the missing number of the rear lamp beads; in the sector-shaped reference region, extending a reference connection line between the front lamp beads and arranging missing number of rear lamp beads at equal intervals; applying a polar coordinate system, and providing a corresponding sector-shaped spatial position for each of the rear lamp beads;

a description construction module, which is configured to map the sector-shaped spatial positions of the lamp beads on the surface of the sector-shaped reference region to corresponding stereoscopic spatial positions in a modeling space where the conical model is located, and obtain the lamp chain circling model.

9. A computer apparatus, comprising a central processing unit and a memory, wherein the central processing unit is used for calling and running computer programs stored in the memory to execute steps in the method according to claim 1.

10. A computer program product, comprising computer programs or computer instructions, wherein steps in the method according to claim 1 are executed when the computer programs or the computer instructions are called and run by a central processing unit.

* * * * *